United States Patent [19]

Kim

[11] Patent Number: 5,446,499
[45] Date of Patent: Aug. 29, 1995

[54] WINDOW SIGNAL GENERATING APPARATUS

[75] Inventor: Han-Soo Kim, Seoul, Rep. of Korea

[73] Assignee: Daewoo Electronics Co., Inc., Seoul, Rep. of Korea

[21] Appl. No.: 172,036

[22] Filed: Dec. 22, 1993

[30] Foreign Application Priority Data

Dec. 23, 1992 [KR] Rep. of Korea .............. 92-25237

[51] Int. Cl.$^6$ .............................................. H04N 9/74
[52] U.S. Cl. ................................... 348/596; 348/590; 345/118; 395/157
[58] Field of Search ............ 348/17, 14, 15, 16, 348/387, 390, 399, 596, 170, 593, 590; H04N 7/14, 7/15, 7/12, 9/74; 345/118, 119, 120; 382/48; 395/134, 157

[56] References Cited

U.S. PATENT DOCUMENTS

| 4,400,728 | 8/1983 | Long | 348/138 |
|---|---|---|---|
| 4,570,181 | 2/1986 | Yamamura | 348/596 |
| 4,660,154 | 4/1987 | Dodge | 395/157 |
| 4,692,806 | 9/1987 | Anderson et al. | 348/399 |
| 4,780,710 | 10/1988 | Tatsumi | 345/120 |
| 4,814,884 | 3/1989 | Johnson et al. | 348/596 |
| 4,953,027 | 8/1990 | Tong et al. | 348/596 |
| 4,959,802 | 9/1990 | Slaughter et al. | 364/521 |
| 5,115,314 | 5/1992 | Ross et al. | 348/596 |
| 5,185,597 | 2/1993 | Pappas et al. | 345/118 |
| 5,253,059 | 10/1993 | Ansari et al. | 348/390 |
| 5,258,836 | 11/1993 | Murata | 348/14 |
| 5,339,104 | 8/1994 | Hong | 348/596 |

FOREIGN PATENT DOCUMENTS

302982 12/1989 Japan .............. H04N 7/14

Primary Examiner—James J. Groody
Assistant Examiner—Chris Grant
Attorney, Agent, or Firm—William F. Pinsak

[57] ABSTRACT

An apparatus for use in a low-bit rate coding system is provided for preprocessing a video signal including interlaced even- and odd-numbered fields, each of the fields having video lines, and each of said lines consisting of pixels, resulting from scanning an image, to selectively define a window within the image before the video signal is coded for transmission in the low-bit rate coding system. The apparatus comprises a field window signal generator for providing a field window signal to enable the selective sampling of the field, a vertical window signal generator, in response to the fields window signal, for producing a vertical window signal to define the lines in the sampled field, and a horizontal window signal generator, in response to the vertical window signal, for producing a horizontal window signal to define the pixels for each of the derived lines.

5 Claims, 7 Drawing Sheets

WINDOW SIGNAL GENERATING APPARATUS

FIELD OF THE INVENTION

The present invention relates to an apparatus for preprocessing a video signal before it is coded via a low bit rate coding scheme in such systems as a video telephone; and, more particularly, to an apparatus which is designed to define a window having a particular characteristic within an image in order to reduce the volume of data to be processed in, e.g., a video telephone.

BACKGROUND OF THE INVENTION

Study group XV of the CCITT (Consultative Committee on International Telephony and Telegraphy) which is an organization to standardize coding methods for video signals has recommended an interframe coder for low bit rate transmission of visual telephony signals, known as model H.261(CCITT, 1989). The CCITT H.261 standard has been developed for use in video teleconferencing and video telephony applications. It can operate at a frequency range from 64 kilobits(Kbits) per second to 1.92 megabits(Mbits) per second, and upon images between 525 and 625 lines in a common intermediate format(CIF).

Because of the severe demand to greatly reduce data for transmission, the low bit rate coding system such as the one recommended for use in a video telephone makes use of a spatial subsampling technique whereby only a limited number of pixels is sampled horizontally or vertically across an image before any coding thereof takes place. In view of the severe demand of data reduction, however, it would be desirable to develope a system capable of reducing the amount of data even before it is processed by the low bit rate coding system. One of such approaches as conceived by the present inventor is to select a given region or window having a particular feature, e.g., a facial picture, within an image captured by a video camera provided within the video telephone and then apply the coding process to the selected window only.

SUMMARY OF THE INVENTION

Accordingly, it is an object of the invention to provide an apparatus for preprocessing a video signal before any coding thereof for transmission takes place in a low bit rate coding system such as a video telephone.

Another object of the present invention is to provide an apparatus for selecting a window having a particular feature within an image in order to reduce the amount of data to be processed in the low bit rate coding system.

In accordance with the present invention, there is provided an apparatus for preprocessing a video signal consisting of interlaced even- and odd-numbered fields, each of the fields having video lines, and each of said lines being divided into pixels, resulting from the scanning of an image, to selectively define a window having special region within an image. The apparatus comprises a field window signal generator for providing a field window signal which allows the selective sampling of the fields, a vertical window signal generator in response to the field window signal for producing a vertical window signal for deriving the lines in the sampled field, and a horizontal window signal generator in response to the vertical window signal for producing a horizontal window signal for deriving the pixels for each of the derived lines.

BRIEF DESCRIPTION OF THE DRAWINGS

The above and other objects and features of the present invention will become apparent from the following description of preferred embodiments with reference to the accompanying drawings, in which.

DETAILED DESCRIPTION OF THE PREFERRED EMBODIMENTS

Figure 1:
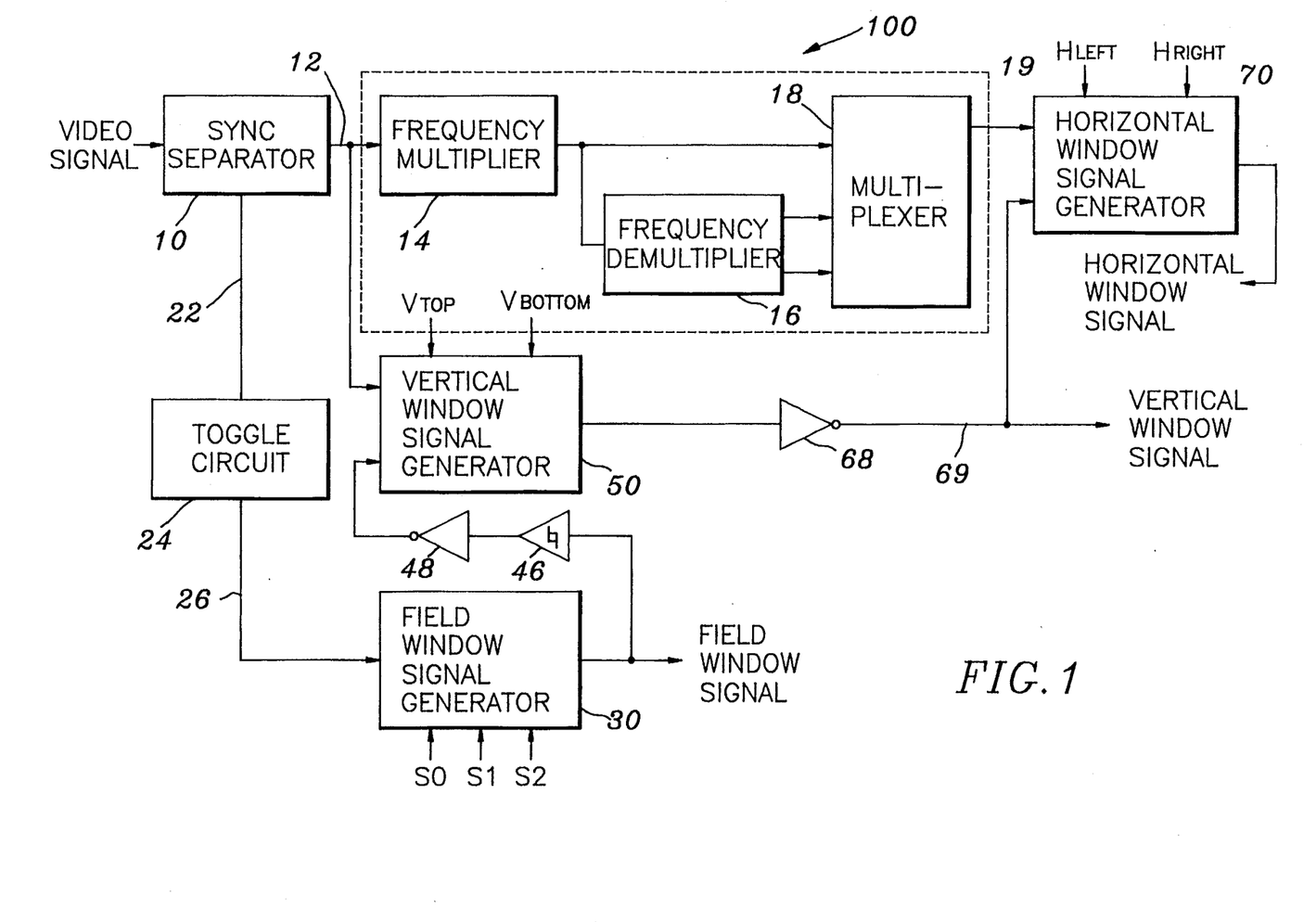
FIG. 1 is a schematic block diagram of an apparatus for generating a window within an image in accordance with the present invention.

Referring to FIG. 1, there is shown an apparatus for preprocessing a video signal in accordance with a preferred embodiment of the present invention, which is adapted to produce a window signal to selectively define a window within an image and then provide the window signal to a low bit rate coding system such as a video telephone so that the video telephony processes only the data contained in the window.

The video signal utilized in the present invention is a signal of the standard type which results from scanning an image in the horizontal direction with successive video lines separated by a horizontal blanking interval wherein each of the video lines is interlaced in two groups to form an even-numbered and an odd-numbered fields, separated by a vertical blanking interval with each of said lines consisting of pixels.

The video signal preprocessing apparatus 100 comprises a sync separator 10, a pixel clock generator 20, a field window signal generator 30, a vertical window signal generator 50 and a horizontal window signal generator 70.

The sync separator 10, of a Conventional design which may include a horizontal sync separator and a vertical sync separator, receives the video signal and provides a horizontal sync signal separated from the video signal on line 12 at the termination of each horizontal blanking interval in the video signal. The horizontal sync signal on line 12 is applied to the pixel clock generator 20 and the vertical window signal generator 50.

The pixel clock generator 20 includes a frequency multiplier 14 for converting the; frequency of the horizontal sync signal at 15.734 KHz (in case of NTSC standard) to a pixel clock sampling frequency at 13.5 MHz as recommended in CCIR 601. Optionally, the pixel clock generator 20 may include a frequency demultiplier 16 for converting the frequency at 13.5 MHz to a pixel clock sampling frequency at 6.75 MHz and a pixel clock sampling frequency at 3.375 MHz according to the CIF standard and the quarter CIF standard, respectively, and a multiplexer 18 for selectively outputting the pixel clocks at the frequencies of 13.5 MHz, 6.75 MHz and 3.375 MHz through a control signal (not shown). The pixel clock selected by the multiplexer 18 is applied to tile horizontal window signal generator 50 which will be discribed below in connection with FIG. 4.

Figure 5:
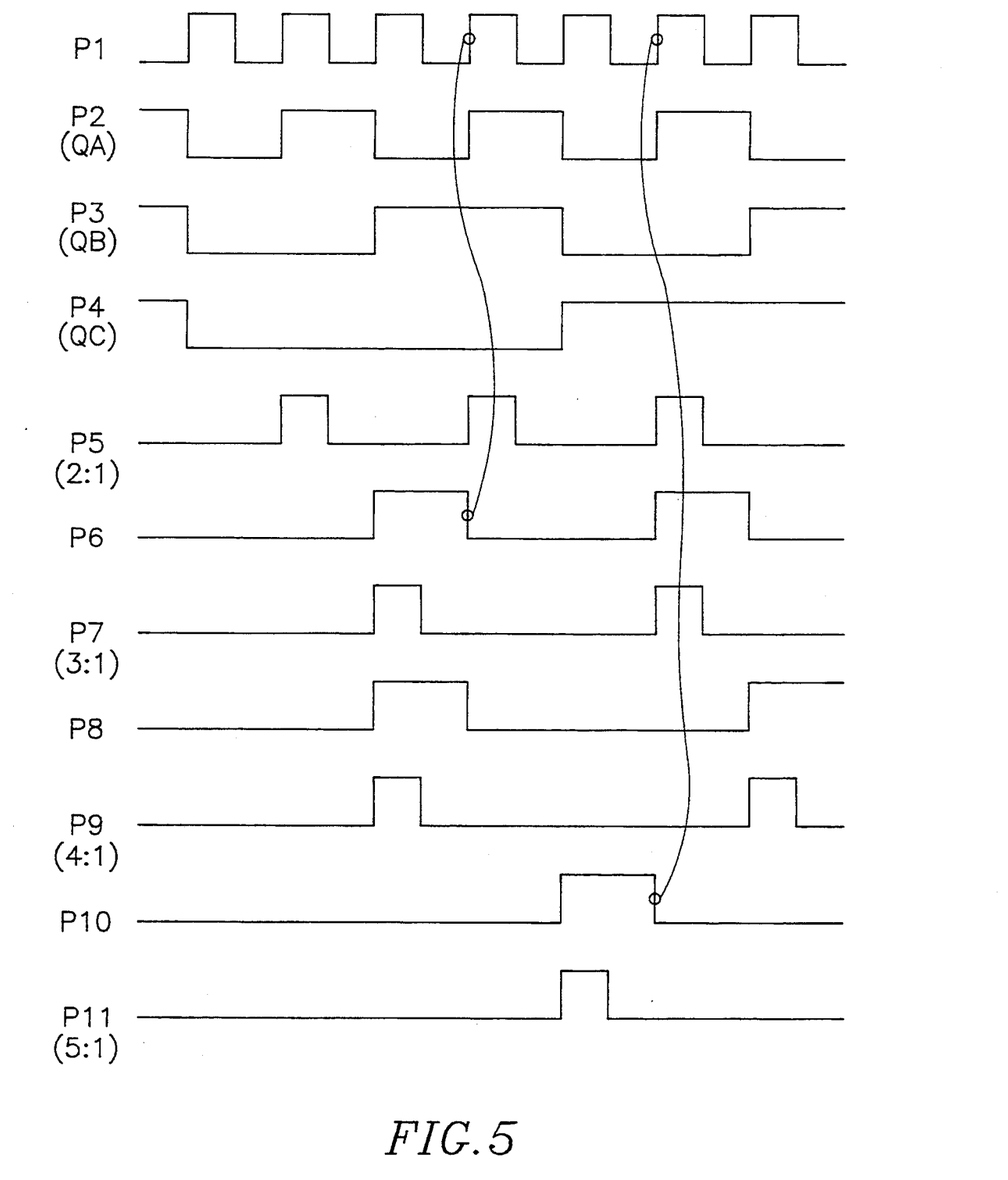
FIG. 5 illustrates various waveforms generated from each part of the apparatus as shown in FIG. 1.

Further, the sync separator 10 provides a vertical sync signal at the termination of each vertical blanking interval in the video signal on line 22. In response to this vertical sync signal, a toggle circuit 24 changes the logical state of the signal. Accordingly, the toggle circuit 24 provides at this output on line 26 a field interval signal such as a square waveform having alternating logical states at the field rate of the video signal. In describing the operation of the present embodiment hereinafter, the fields wherein the waveform on line 26 provides a logical 1 will be designated as odd fields, whereas the fields wherein the waveform on line 26 provides a logical 0 will be designated as even fields. This waveform on line 26 is illustrated in FIG. 5 as a pulse signal P1.

Figure 2:
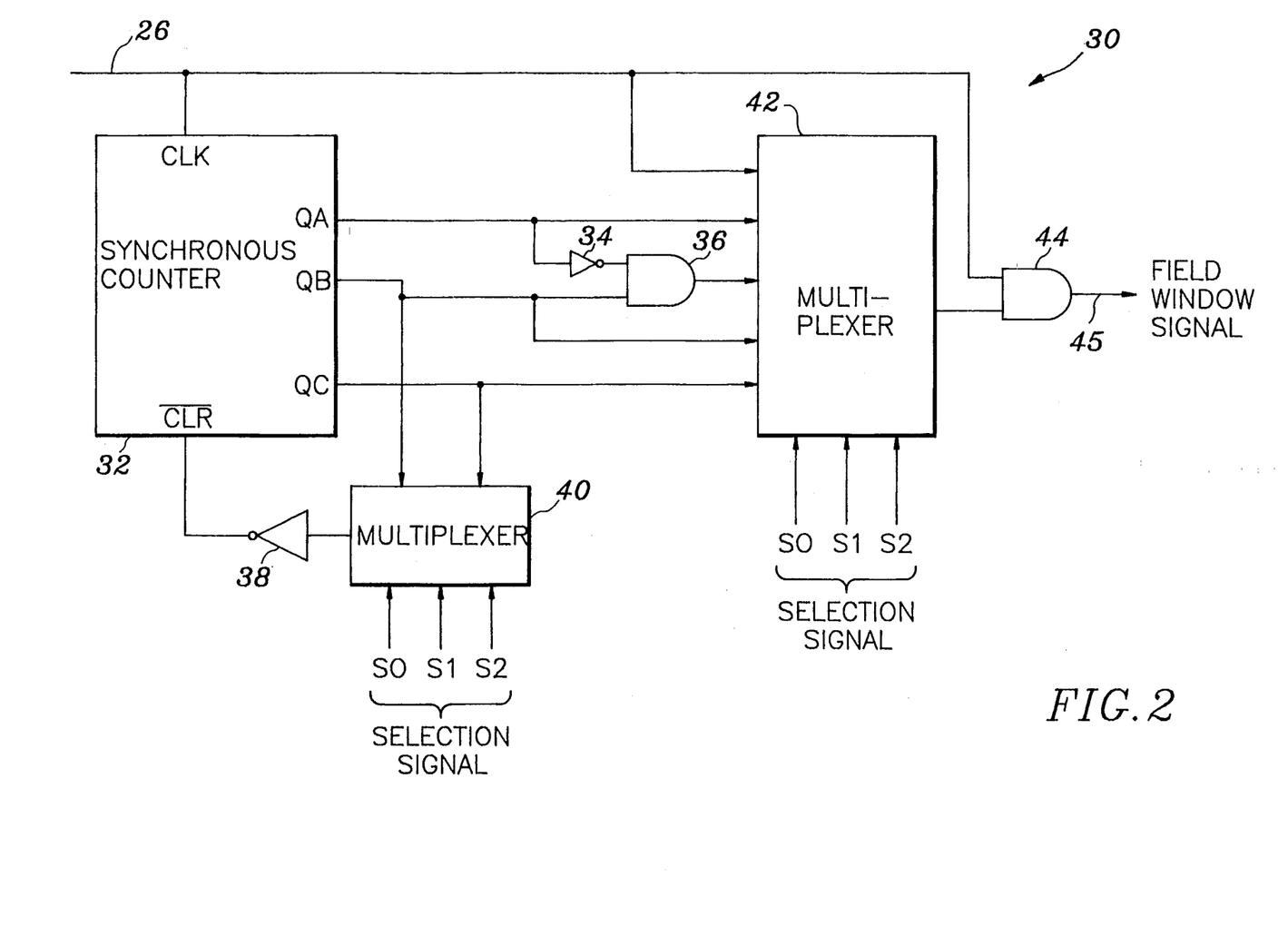
FIG. 2 is a detailed circuit block diagram of the field window signal generator shown in FIG. 1.

The pulse signal P1 on line 26 is connected to the window signal generator 30 which comprises a synchronous counter 32 and a multiplexer 42 as shown in FIG. 2.

Referring to FIG. 2, the pulse signal P1 is applied to a clock input CLK of the synchronous counter 32 and a first input of the multiplexer 42. In synchronization with a rising (positive-going) edge of the pulse signal P1, the synchronous counter 32 produces at its outputs QA, QB, and QC three count pulses which take the form of successively cascading pulses as waveforms P2, P3 and P4 shown in, FIG. 5, respectively. Each of the pulses from the synchronous counter 32 is used to determine the field rate of the video signal.

The pulse P2 at the output QA of the synchronous counter 32 is applied to a second input of the multiplexer 42 and an input of an AND gate 36 through an inverter 34. The pulse P3 at the output QB of the synchronous counter 32 is applied to a third input of the multiplexer 42 and to the other input of the AND gate 36 whose output is applied to a fourth input of the multiplexer 42. And, the pulse P4 at the output QC of the synchronous counter 32 is directly applied to a fifth input of the multiplexer 42.

The multiplexer 42 selectively outputs one of the input signals depending upon the combination of the selection signals S0, S1, S2 as illustrated in the following function table I and provides it to one input of an AND gate 44.

| Function Table I | | | |
|---|---|---|---|
| S0 | S1 | S2 | OUTPUT |
| 0 | 0 | 0 | Pulse P1 |
| 0 | 0 | 1 | Output at QA of the counter 32 |
| 0 | 1 | 0 | Output at QB of the counter 32 |
| 0 | 1 | 1 | Output of the AND gate 36 |
| 1 | 0 | 0 | Output at QC of the counter 32 |

Also, each of the pulses P3 and P4 at the outputs QB and QC of the synchronous counter 32 is conveyed to each input of a multiplexer 40. The multiplexer 40 selectively outputs the pulses P3 and P4 depending on the combination of the selection signals S1, S2 and S3 as illustrated in the function table II given below.

| Function Table II | | | |
|---|---|---|---|
| S0 | S1 | S2 | OUTPUT |
| 0 | 0 | 0 | Not selected |
| 0 | 0 | 1 | Not selected |
| 0 | 1 | 0 | Output at QB of the counter 32 |
| 0 | 1 | 1 | Not selected |
| 1 | 0 | 0 | Output at QC of the counter 32 |

The output selected from the multiplexer 40 is sent to an inverter 38 whose output is linked to an inverted clear input $\overline{CLR}$ of the synchronous counter 32. The synchronous counter 32 is selectively reset when the pulse P3 or P4 by way of the inverter 38 is applied to the inverted clear input thereof. When the synchronous counter 32 is reset, the synchronous counter causes the pulses at its outputs QB and QC to be reset to their zero position in synchronization with the subsequent rising edge of the pulse signal applied to the clock input CLK. Therefore, the synchronous counter 32 will produce at its outputs QB and QC new clock pulses designated in FIG. 5 as waveforms P6 and P10, respectively. The synchronous counter 32 described above may be implemented with a known TTL IC, e.g., model 74LS163.

The AND gate 44 combines the field rate selected from the multiplexer 42 and the field interval signal on line 26 and produces a field window signal which allows the selective sampling of the fields.

For example, in case where the combination of the selection signals is "000" to cause the multiplexer 42 to provide the pulse P1 on its output, the AND gate 44 produces on its output the pulse P1 for sampling each of the even-numbered fields. And, in case where the combination of the selection signals is "001" to cause the multiplexer 42 to provide the pulse P2 at the QA of the counter 32 on its output, the AND gate 44 produces on its output the pulse P5 for sampling one field per every four fields. However, in case where the combination of the selection signals is "010" to cause the multiplexers 40 and 42 to output the pulse P3 at the QB of the counter 32, the pulse P3 is fed back to the inverted clear input of the synchronous counter 32 through the inverter 38. Then, the synchronous counter 32 produces at its output QB the pulse P6. Accordingly, the AND gate 44 produces on its output the pulse PV as shown in FIG. 5 for sampling one field per every six fields. Similarly, in case where the combination of the selection signals is "100" to cause the multiplexers 40 and 42 to output the pulse P4 at the QC of the counter 32, the pulse P4 is fed back to the inverted clear input of the synchronous counter 32 through the inverter 38. Then, the synchronous counter 32 produces at its output QC the pulse P10. Accordingly, the AND gate 44 produces on its output the pulse P11 for sampling one field per every ten fields. Finally, in case where the combination of the selection signals is "011" to cause the multiplexer 42 to select the output P8 of the AND gate 36, the AND gate 44 produces on its output the pulse P9 wherein one field per every eight fields is sampled.

Therefore, in accordance with the present invention, it is possible to accomplish a temporal subsampling whereby the fields are selectively sampled in accordance with the field window signal so as to Substantially reduce the volume of data to be processed in the video telephone.

Figure 3:
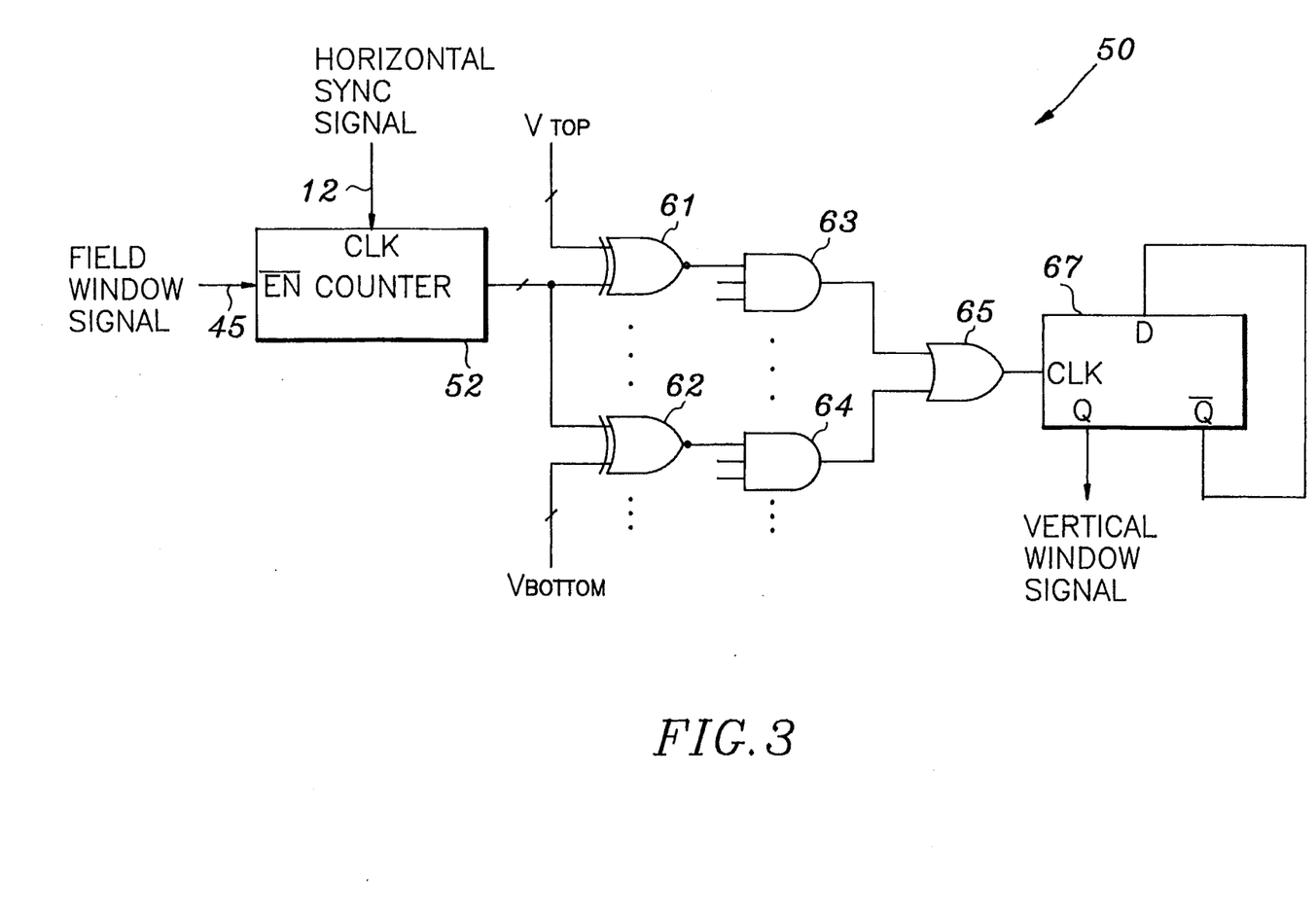
FIG. 3 is a detailed circuit block diagram of the vertical window signal generator shown in FIG. 1.

The field window signal from the field window signal generator 30 is applied to the vertical window signal generator 50 as shown in FIG. 3 by way of a schmitt trigger circuit 46 and then an inverter 48 to invert the output of the schmitt trigger 46, shown in FIG. 1.

Figure 4:
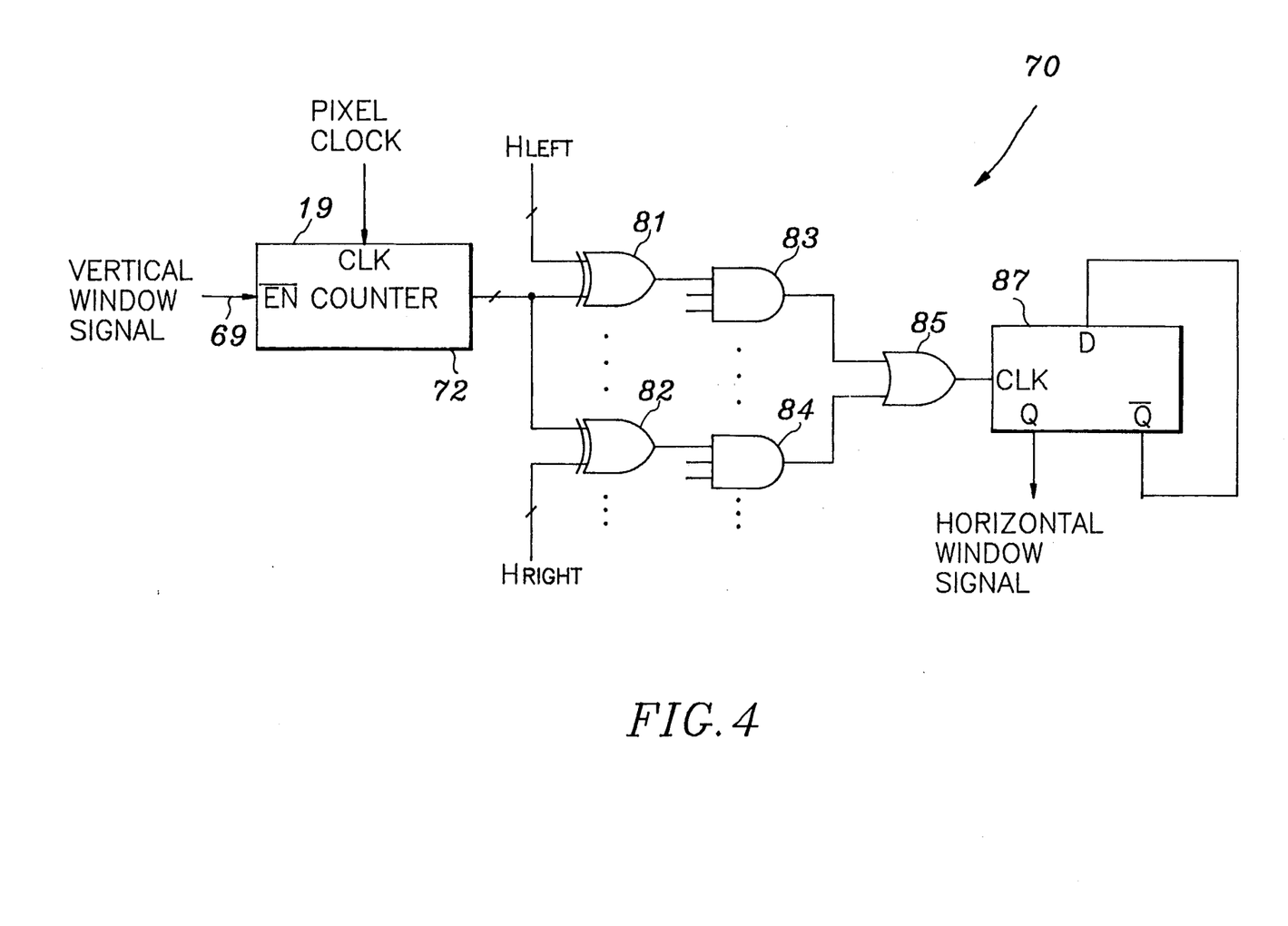
FIG. 4 is a detailed circuit block diagram of the horizontal window signal generator shown FIG. 1.

Referring to FIG. 3, there is shown the circuit diagram of the vertical window signal generator 50. The vertical window signal generator 50 is used to define the window within the image together with the horizontal window signal generator 70 as shown in FIG. 4. In particular, the vertical window signal generator 50 serves to define the vertical direction length of the window while the horizontal window signal generator 70 serves to define the horizontal direction width of the window. The vertical direction length is determined by the number of the lines from a top line position and a bottom line position of the lines and the horizontal direction width is determined by the number of the pixels from a left side pixel position and a right side pixel position for each line.

In accordance with the invention, the length and the width of the window can be arbitrarily adjusted by way of setting the top and the bottom line positions and the left and the right side pixel positions for each line at the desired values. The values of the top and the bottom line positions for the window are assigned as a variable $V_{TOP}$ and a variable $V_{BOTTOM}$, respectively. Also, the values for the left and the right side pixel positions are assigned as a variable $H_{LEFT}$ and a variable $H_{RIGHT}$, respectively.

The horizontal sync signal from the sync separator 10 in FIG. 1 is applied to a clock input CLK of a counter 52 through line 12 and the field window signal from the field window signal generator 30 is applied to an inverted enable input $\overline{EN}$ of the counter 52 through line 45.

The counter 52 counts the number of the horizontal sync signals when the counter 52 is enabled by the field window signal. Each count bit output from the counter 52 is applied to one input for each of a first set of exclusive NOR gates (representatively shown as 61 in FIG. 3) and a second set of exclusive NOR gates (representatively shown as 62 in FIG. 3); and a bit for the $V_{TOP}$ and a bit for the $V_{BOTTOM}$ are received at their respective another input as shown in FIG. 3. The remaining exclusive NOR gates are essentially identical except for the values provided to their respective inputs. Each of the horizontal sync signals counted between the $V_{TOP}$ and $V_{BOTTOM}$ is used to derive a line to define the vertical length of the window.

When the count bit from the counter 52 is identical to the value of the $V_{TOP}$, the exclusive NOR gate 61 produces at its output a logical "1" to an AND gate 63. This operation will concurrently take place at the remaining exclusive NOR gates. Accordingly, the output of the AND gate 63 produces a logical "1" to one input of an OR gate 65. Similarly, when the count bit from the counter 52 is identical to the value of the $V_{BOTTOM}$, the exclusive NOR gate 62 produces at its output a logical "1" to an AND gate 64. The AND gate 64 produces a logical "1" to another input of the OR gate 65. Accordingly, whenever each of the AND gates 63 and 64 provides on its output a logical "1", the OR gate 65 produces a logical "1" to a clock input of a D type flip-flop(F/F) 67 which is constructed to feed its inverted output $\overline{Q}$ back to its input D. Accordingly, the F/F 67 produces at its output Q the horizontal sync signals between the $V_{TOP}$ and the $V_{BOTTOM}$ as the vertical window signal, from which the line corresponding to each horizontal sync signal is defined. The vertical window signal is applied to the horizontal window signal generator 70 as shown in FIG. 4.

Figure 6:
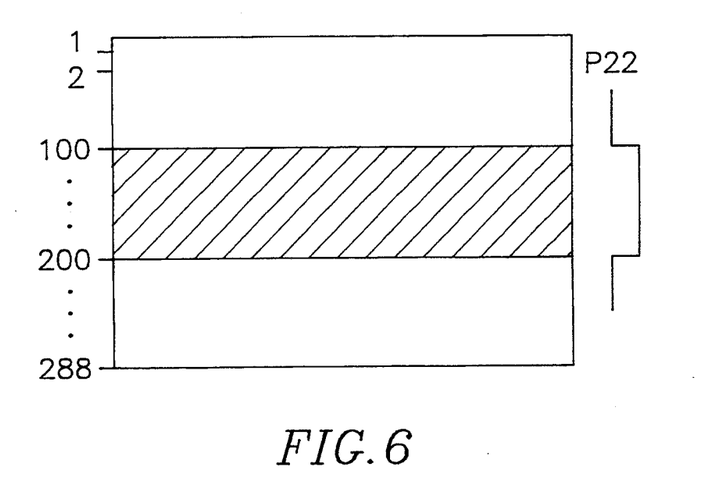
FIGS. 6 and 8 show exemplary window patterns generated by the vertical and the horizontal window signal generators, respectively.
Figure 7:
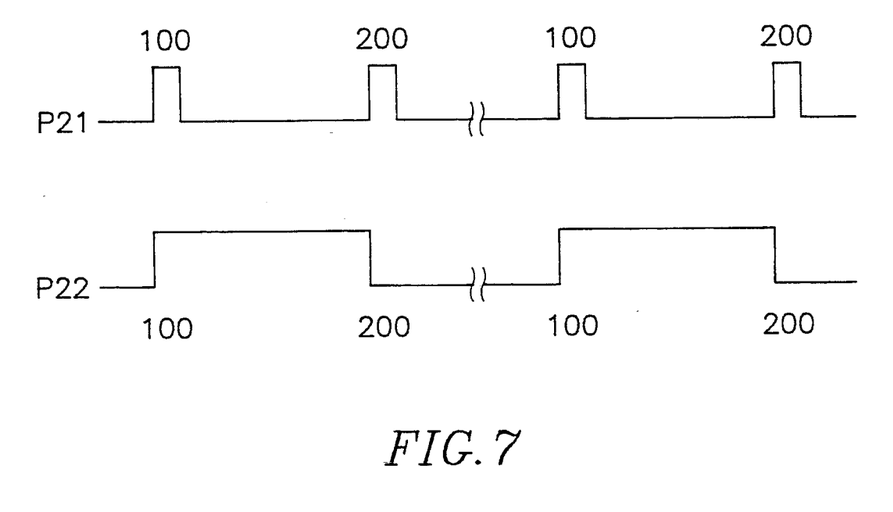
FIGS. 7 and 9 provide exemplary waveforms generated in connection with FIGS. 6 and 8, respectively.

FIG. 6 shows an exemplary window pattern on a monitor wherein the $V_{TOP}$ is set to have the value of 100 and the $V_{BOTTOM}$ is set to have the value of 200. FIG. 7 shows each of the exemplary waveforms generated from the vertical window signal generator 50 in relation to the window illustrated in FIG. 6 wherein a pulse P21 represents the output of the OR gate 65 and a pulse P22 represents the output of the F/F 67.

Referring back to FIG. 4, the horizontal window signal generator 70 has a similar construction to that of the vertical window signal generator 50 of FIG. 3. The pixel clock on line 19 is applied to a clock input CLK of a counter 72 and the vertical window signal on line 69 is applied to an inverted enable input $\overline{EN}$ of the counter 72.

The counter 72 counts the number of the pixel clock signals whenever the counter 72 is enabled upon the receipt of the vertical window signal from the vertical window signal generator 50. Each count bit output from the counter 72 is applied to one input for each of a first set of exclusive NOR gates and a second set of exclusive NOR gates and each binary digit of the $H_{LEFT}$ is applied to another input for each of the first set of the exclusive NOR gates and each binary digit of the $H_{RIGHT}$ is applied to another input for each of the second set of the exclusive NOR gates, wherein two exclusive NOR gates 81 and 82 are shown, by way of illustration, to receive a count bit from the counter 72, a bit of the $H_{LEFT}$ and a bit of the $H_{RIGHT}$ shown in FIG. 4, respectively. The remaining exclusive NOR gates are essentially identical except for the values provided to their respective inputs. Each of the pixel clocks counted between the values of $H_{LEFT}$ and $H_{RIGHT}$ is used to derive a pixel for each line to define the horizontal width of the window.

When the count bit from the counter 72 is identical to the value of the $H_{LEFT}$, the exclusive NOR gate 81 produces at its output a logical "1" to an AND gate 83. This operation occurs concurrently at the remaining exclusive NOR gates. Accordingly, the AND gate 83 produces a logical "1" to one input of an OR gate 85. Similarly, when the count bit from the counter 72 is identical to the value of the $H_{RIGHT}$, the exclusive NOR gate 82 produces at its output a logical "1" to an AND gate 84. The AND gate 84 produces a logical "1" to another input of the OR gate 85. Accordingly, whenever each of the AND gates 83 and 84 provides at its output a logical "1", the OR gate 85 produces a logical "1" to a clock input of a D type flip-flop(F/F) 87 which is constructed to feed its inverted output $\overline{Q}$ back to the its input D. Accordingly, the F/F 87 produces at its output Q the pixel clocks between the $H_{LEFT}$ and the $H_{RIGHT}$ as the vertical window signal from which the pixel corresponding to each interval of the pixel clock is defined.

Figure 8:
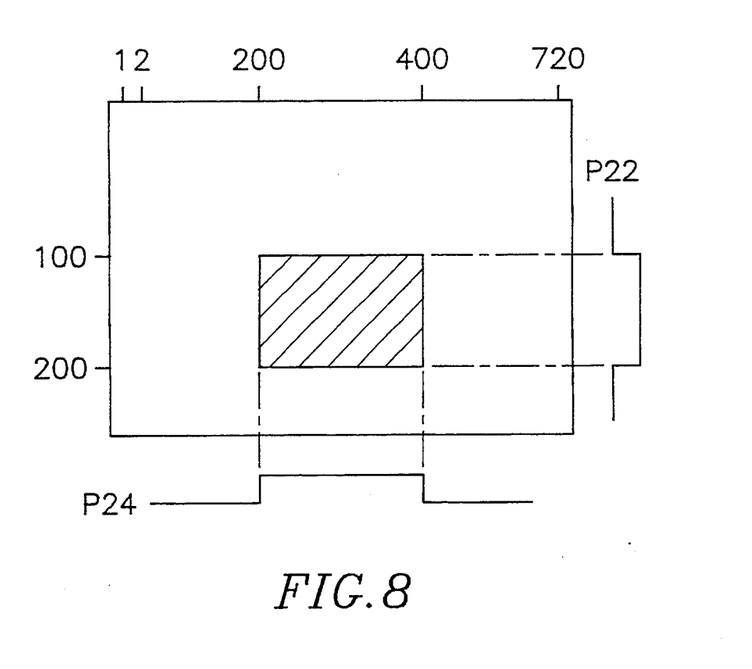
Figure 9:
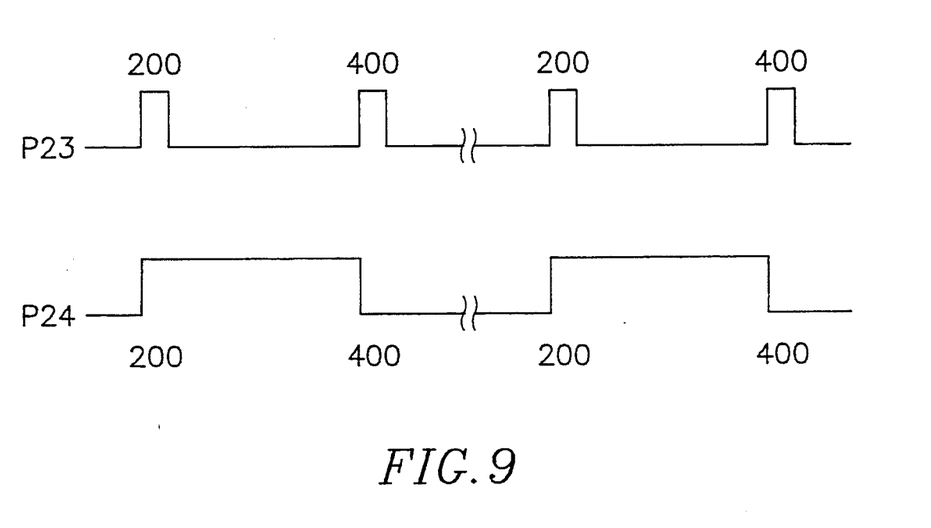

FIG. 8 shows an exemplary window pattern on a monitor in case where the $H_{LEFT}$ is set to have the value of 200 and the $H_{RIGHT}$ is set to have the value of 400. FIG. 9 in turn shows each of the exemplary waveforms generated from the horizontal window signal generator 70 in relation to the window illustrated in FIG. 8, wherein a pulse P23 represents the output of the OR gate 85 and a pulse P24 represents the output of the F/F 87.

Accordingly, the window signals including the field window signal, the vertical window signal and the horizontal window signal will be attributable for the determination of a window within an image. The window has a square area consisting of, e.g., M lines×N pixels wherein the coefficient M is determined from the $V_{TOP}$ and the $V_{BOTTOM}$ and the coefficient N is determined from the $H_{LEFT}$ and $H_{RIGHT}$. The data corresponding to the window will be applied to a encoder in the video telephone so that the encoder processes the reduced data only.

While the present invention has been described with respect to the particular embodiments only, it will be apparent to those skilled in the art that various changes and modifications may be made without departing from the spirit and the scope of the invention as defined in the claims.

What is claimed is:

1. An apparatus in a low-bit rate coding system for preprocessing a video signal including interlaced even-numbered and odd-numbered fields, each of the fields having video lines, and each of the video lines consisting of pixels, resulting from scanning an image, to selectively define a window within the image before the video signal is coded for transmission in the low-bit rate coding system, which comprises:

means for receiving the video signal and providing a horizontal sync signal and a field interval signal which defines the even-numbered fields and the odd-numbered fields;

a pixel clock generator for receiving the horizontal sync signal and converting the horizontal sync signal to a pixel clock;

a field window signal generator for receiving the field interval signal and providing a field window signal which allows the selective sampling of the fields;

means for defining the window, said means including a vertical window signal generator in response to the field window signal for counting the number of the horizontal sync signals between a first set value and a second set value to produce a vertical window signal for deriving the lines in the sampled field, and a horizontal window signal generator in response to the vertical window signal for counting the number of the pixel clocks between a third set value and a fourth set value to produce a horizontal window signal for deriving the pixels for each of the derived lines.

2. The apparatus of claim 1, wherein the pixel clock generator includes:

a frequency multiplier for converting the horizontal sync signal to a first pixel clock having the frequency of 13.5 MHZ;

a frequency demultiplier for converting the first pixel clock to a second pixel clock having the frequency of 6.75 MHz and a third pixel clock having the frequency of 3.75 MHz, respectively; and a first multiplexer for selectively providing the first, the second and the third pixel clocks by using a selection signal to the horizontal window signal generator.

3. The apparatus of claim 1, wherein the field window signal generator includes:

means, in response to the field interval signal, for producing a plurality of field rate signals;

a second multiplexer for selecting one from the plurality of the field rate signals by using a control signal; and means for combining the field interval signal and the field rate signal selected by the second multiplexer and providing the field window signal to the vertical window signal generator.

4. The apparatus of claim 3, wherein the vertical window signal generator includes:

a first counter, when triggered by the field window signal, for counting the number of the horizontal sync signals; and means for comparing the counted number on the first counter with the first and the second set values and producing the horizontal sync signals between the first and the second set values as the vertical window signal so as to determine the vertical length of the window.

5. The apparatus of claim 4, wherein the horizontal window signal generator includes:

a second counter, when triggered by the vertical window signal, for counting the number of the pixel clocks; and means for comparing the counted number on the second counter with the third and the fourth set values and producing the pixel clocks between the third and the fourth set values as the horizontal window signal so as to determine the horizontal width of the window.

* * * * *